US009524332B2

(12) United States Patent
Shin et al.

(10) Patent No.: US 9,524,332 B2
(45) Date of Patent: Dec. 20, 2016

(54) METHOD AND APPARATUS FOR INTEGRATEDLY MANAGING CONTENTS IN PORTABLE TERMINAL

(71) Applicant: Samsung Electronics Co., Ltd., Gyeonggi-do (KR)

(72) Inventors: Youngsun Shin, Gyeonggi-do (KR); Sungho Park, Seoul (KR); Chaekyung Lee, Seoul (KR); Kyunghoon Han, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 133 days.

(21) Appl. No.: 13/705,464

(22) Filed: Dec. 5, 2012

(65) Prior Publication Data

US 2013/0144883 A1 Jun. 6, 2013

(30) Foreign Application Priority Data

Dec. 6, 2011 (KR) ........................ 10-2011-0129601

(51) Int. Cl.
*G06F 7/00* (2006.01)
*G06F 17/30* (2006.01)
*G09G 5/377* (2006.01)

(52) U.S. Cl.
CPC ... *G06F 17/30598* (2013.01); *G06F 17/30115* (2013.01); *G06F 17/30197* (2013.01); *G06F 17/30233* (2013.01); *G09G 5/377* (2013.01)

(58) Field of Classification Search
CPC ................ G06F 17/30115; G06F 17/30867; G06F 2203/04808

USPC ............... 707/738, 690, 688, 692, 610, 635, 612,707/616, 999.107
See application file for complete search history.

(56) References Cited

U.S. PATENT DOCUMENTS

| | | | |
|---|---|---|---|
| 6,285,995 B1 * | 9/2001 | Abdel-Mottaleb et al. | .. 707/737 |
| 7,644,366 B1 | 1/2010 | McKinney | |
| 7,689,933 B1 * | 3/2010 | Parsons | ......................... 715/838 |
| 7,950,034 B2 * | 5/2011 | Sano et al. | ...................... 725/44 |
| 8,732,149 B2 * | 5/2014 | Iida et al. | ..................... 707/705 |
| 2005/0024513 A1 * | 2/2005 | Hayashi et al. | ......... 348/333.01 |
| 2006/0107208 A1 * | 5/2006 | Sugimori et al. | ............ 715/526 |
| 2007/0024722 A1 * | 2/2007 | Eura et al. | ................. 348/231.2 |
| 2009/0036750 A1 * | 2/2009 | Weinstein et al. | ............ 600/300 |
| 2009/0278997 A1 * | 11/2009 | Sano | ...................... G06F 3/147 |
| | | | 348/739 |
| 2009/0309901 A1 * | 12/2009 | Jho | ............................... 345/684 |
| 2011/0035691 A1 * | 2/2011 | Kim | ............................... 715/765 |
| 2011/0103700 A1 * | 5/2011 | Haseyama | .................... 382/225 |

(Continued)

FOREIGN PATENT DOCUMENTS

JP       4378292 B2    12/2009

*Primary Examiner* — Mohammed R Uddin
(74) *Attorney, Agent, or Firm* — Cha & Reiter, LLC.

(57) ABSTRACT

Provided are a method of managing contents in a portable terminal which may, in integrated fashion, display contents stored in other locations on one screen and conveniently manage the contents according to similarity of the contents, and an apparatus thereof. The method for managing, in integrated fashion, contents in a portable terminal including: receiving contents having different storage locations and displaying, in integrated fashion, the received contents on one screen. Convenience to the user ease of operation can thus be improved when managing related contents stored at different locations.

22 Claims, 9 Drawing Sheets

(56) References Cited

U.S. PATENT DOCUMENTS

| | | | |
|---|---|---|---|
| 2011/0208750 A1* | 8/2011 | Miyazaki | 707/748 |
| 2011/0225156 A1* | 9/2011 | Pavlik | 707/737 |
| 2011/0243452 A1* | 10/2011 | Sakaguchi et al. | 382/190 |
| 2011/0246942 A1* | 10/2011 | Misawa | 715/830 |
| 2013/0040663 A1* | 2/2013 | Gold | 455/456.3 |
| 2013/0081083 A1* | 3/2013 | Yu et al. | 725/40 |
| 2013/0156275 A1* | 6/2013 | Amacker et al. | 382/118 |
| 2013/0212655 A1* | 8/2013 | Hoyos et al. | 726/5 |
| 2013/0238467 A1* | 9/2013 | Iwabuchi et al. | 705/26.62 |
| 2013/0238724 A1* | 9/2013 | Cunningham | 709/206 |
| 2014/0037203 A1* | 2/2014 | Garcia Morato Fernandez Baillo et al. | 382/165 |
| 2014/0072204 A1* | 3/2014 | Minekawa et al. | 382/149 |

\* cited by examiner

METHOD AND APPARATUS FOR INTEGRATEDLY MANAGING CONTENTS IN PORTABLE TERMINAL

CLAIM OF PRIORITY

This application claims the benefit under 35 U.S.C. §119 (a) of a Korean patent application filed on Dec. 6, 2011 in the Korean Intellectual Property Office and assigned Ser. No. 10-2011-0129601, the entire disclosure of which is hereby incorporated by reference.

BACKGROUND OF THE INVENTION

1. Field of the Invention

The present invention relates to a method and an apparatus for managing contents, and more particularly, to a method of managing contents in a portable terminal in integrated fashion, which may display in integrated fashion, contents stored in other locations on one screen and conveniently manage the contents according to similarity of the contents, and an apparatus thereof.

2. Description of the Related Art

In recent years, with the significant development of information and communication technology and semiconductor technology, supply and use of all types of portable terminals have rapidly increased. The electronic devices may provide various functions. For example, the electronic devices provide a TV viewing function (e.g., mobile broadcasting such as Digital Multimedia Broadcasting (DMB)) or Digital Video Broadcasting (DVB)), a music playback function (e.g., MPEG Audio Layer-3 (MP3), a photograph function, a data communication function, an Internet access function, and a near field wireless communication function. Particularly, as multi-media service functions improve, recently manufactured portable terminals may store various contents such as electronic books, music files, or video files. Further, the portable terminal may establish a communication channel with a cloud server, a web server providing a contents storage function, with another terminal, and synchronize and share the contents of these other devices and systems.

As described above, when contents are separated in different storage locations, a portable terminal according to the related art displays contents based on storage locations when display of the contents is requested. As a result, it is inconvenient for a user to manage the contents of the portable terminal. Accordingly, there is a need to have a method for displaying contents having different storage locations on one screen so that a user can easily manage such contents.

SUMMARY OF THE INVENTION

The present invention has been made in view of the above problems, and provides a method and apparatus for managing, in integrated fashion, contents whose storage location are different.

The present invention further provides a method and an apparatus for managing contents, in integrated fashion, in a portable terminal which may classify contents based on similarity of contents stored in different locations and recommend contents associated with the classified contents to easily manage the contents.

The present invention further provides a method and apparatus for managing, in integrated fashion, contents(i.e., information) in a portable terminal which displays only one representative content when the same contents are stored in a plurality of storage locations.

In accordance with an aspect of the present invention, a method for managing, in integrated fashion, contents in a portable terminal, including: receiving contents having different storage locations; and displaying, in integrated fashion, the received contents on one screen.

In accordance with another aspect of the present invention, an apparatus for managing, in integrated fashion, contents in a portable terminal, includes: a radio frequency communication unit receiving contents having different storage locations; a display panel integratedly displaying the received contents on one screen; and a controller controlling the radio frequency communication unit and the display panel.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. For the purpose of clarity and simplicity, detailed descriptions of well-known functions and structures incorporated herein may be omitted to avoid obscuring the subject matter of the present invention. Hereinafter, the terms "content" or "contents" may be used to describe various types of data and/or information stored, processed, transferred or otherwise exist in the apparatus of the present invention and/or any portions thereof. Data and other types of information may be part of or the entire contents. Prior to a detailed description, an electronic device according to an embodiment of the present invention is a terminal capable of storing and playing contents, and share and transceive contents with another device, and may include a private digital assistant (PDA), a mobile communication terminal, a smart phone, a tablet PC, a tabletop, a digital TV (TeleVision), an Internet Protocol Television (IPTV), and a large format display (LFD). Hereinafter, the mobile communication terminal described by way of example may be any one of the devices mentioned above.

Figure 1:
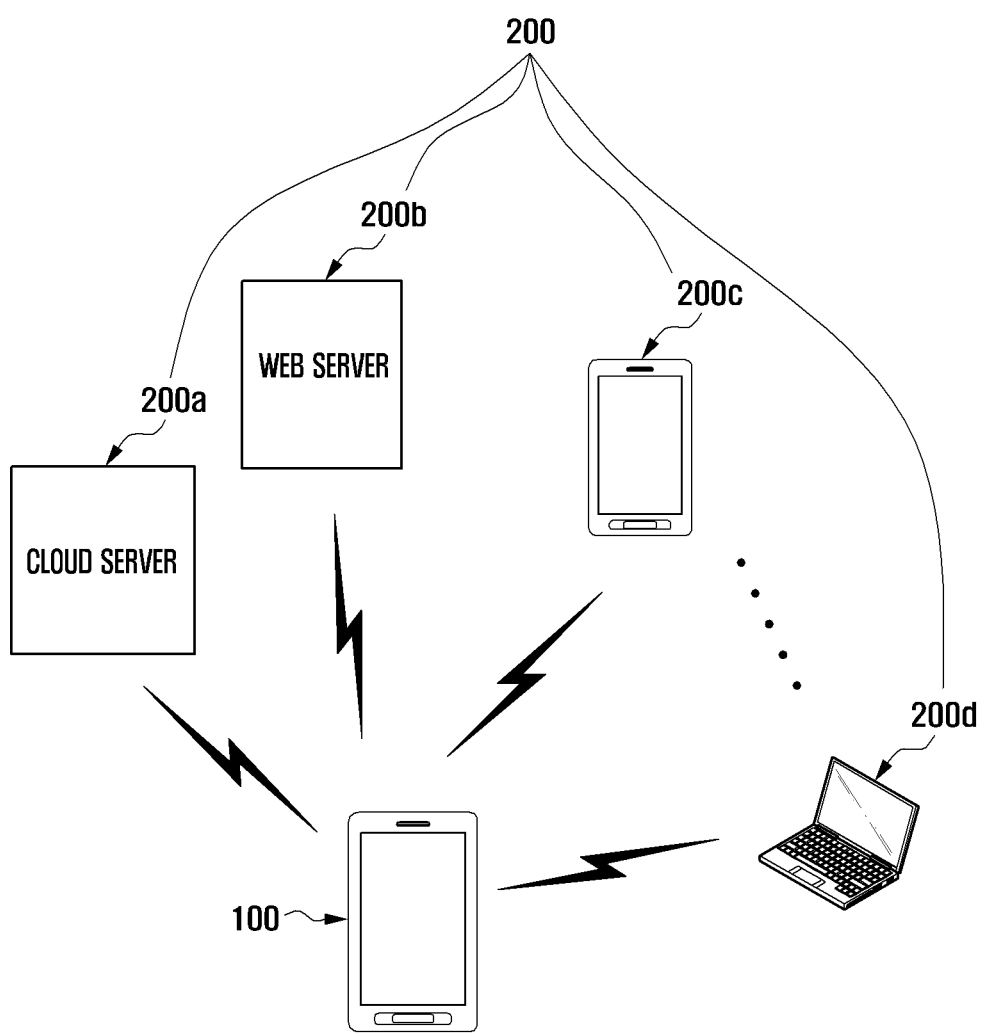
FIG. 1 is a diagram schematically illustrating a configuration of a system for managing, in integrated fashion, contents according to an exemplary embodiment of the present invention.

FIG. 1 is a diagram illustrating a configuration of a system for managing contents, in integrated fashion, according to an exemplary embodiment of the present invention.

Referring to FIG. 1, the system for managing, in integrated fashion, contents according to an exemplary embodiment of the present invention may include a portable terminal 100 and a plurality of devices 200.

The devices 200 may store contents and establish a communication channel with the portable terminal 100. For example, the devices 200 may include a cloud server 200a, a web server 200b providing a community service such as SNS (Social Network Service), blog, cafe, another portable terminal 200c, and a notebook PC 200d. The devices 200 may store access right information with respect to stored contents, edit (deletion, copy, movement) right information of contents, and history information with respect to copy of contents.

The portable terminal 100 may collect meta data of contents from a plurality of devices 200. Next, the portable terminal 100 may classify similar contents based on the collected meta data of the contents. A method of classifying the similar contents will be described in detail below.

The portable terminal 100 may display collected contents and when requested display said contents on one screen. In this case, the portable terminal 100 may distinctly display contents based on similarity. Accordingly, the portable terminal 100 may easily manage (transfer of contents, copy contents and deletion of contents) related contents having different storage locations. To do this, the portable terminal 100 and the devices 200 may synchronize to manage said contents. When performing synchronization, the portable terminal 100 may visually report to a user that synchronization is being performed. For example, the portable terminal 100 may display an icon indicating that the synchronization is being performed in one side (e.g., indicator region) of a screen.

Devices shown in FIG. 1 are examples; the present invention is not limited to the devices shown in FIG. 1. Although FIG. 1 illustrates that the portable terminal 100 and the devices 200 connect with a communication channel in a wireless scheme, the present invention is not limited to such an arrangement. That is, the portable terminal 100 and the devices may communicate over a wired communication channel through a wired cable.

Although the foregoing embodiment has illustrated that contents stored in a plurality of devices are collected to describe different storage locations, the present invention is not limited to such an arrangement. That is, although contents are stored in the same terminal or same server, the present invention may determine that storage locations are different if accounts are different.

Figure 2:
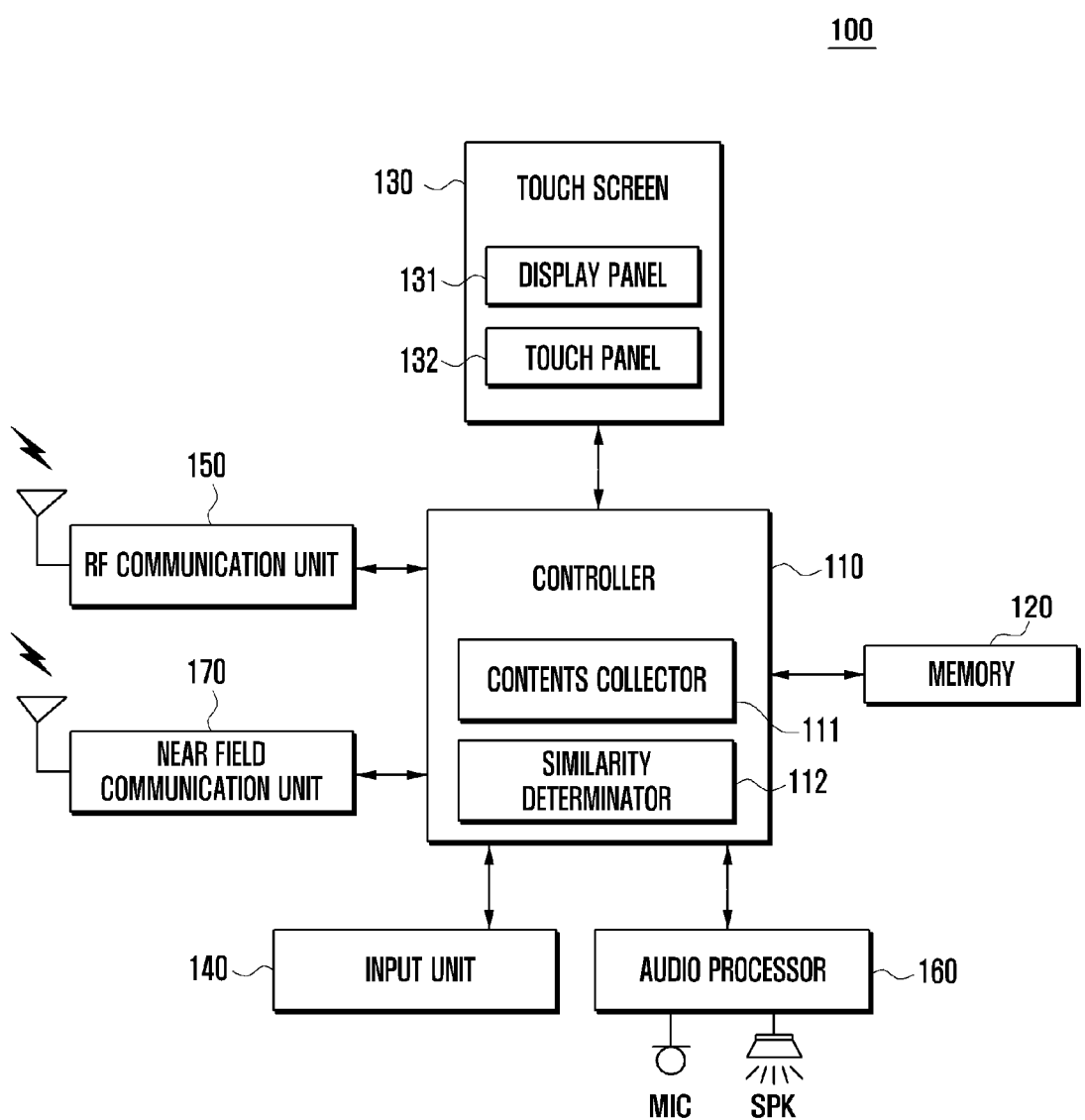
FIG. 2 is a block diagram illustrating a configuration of a portable terminal according to an exemplary embodiment of the present invention.

FIG. 2 is a block diagram schematically illustrating a configuration of a portable terminal according to an exemplary embodiment of the present invention.

Referring to FIGS. 1 and 2, a portable terminal 100 according to an embodiment of the present invention may include a near field communication unit 170, an audio processor 160, an RF communication unit 150, an input unit 140, a touch screen 130, a memory 120, and a controller 110. The touch screen 130 may include a display panel 131 and a touch panel 132, and the controller 110 may include a contents collector 111 and a similarity determinator 112.

The audio processor 160 connects with a microphone MIC and a speaker SPK. The audio processor 160 converts an analog signal received from the MIC into digital signal, and outputs the digital signal to the controller 110. The audio processor 160 converts a digital signal input from the controller 110 into an audible sound and outputs the audible sound through the SPK. That is, the audio processor 160 may convert an analog voice signal input from the MIC into a digital voice signal, or converts a digital voice signal input from the controller 110 into an analog voice signal and outputs the analog voice signal through the SPK.

The input unit 140 includes a plurality of input keys and function keys for receiving numeric or character information and for setting various functions. The functions may include arrow keys, side keys, and hot keys set each allowing a specific function to be performed. The input unit 140 generates and transfers a key signal associated with user setting and function control of the portable terminal 100. The input unit 140 may be implemented by a Qwerty keypad, a 3*4 key pad, a 4*3 key pad including a plurality of keys. The input unit 140 may be implemented by a Qwerty key map, a 3*4 key map, a 4*3 keymap, a menu map, or a control key map outputted on the display panel 131. A display panel 131 of the portable terminal 100 may be in the form of a full touch screen. The input unit 140 may include only a side key provided at a side of a case of the portable terminal 100. Particularly, the input unit 140 of the present invention may generate an input signal for activating a contents integration mode, an input signal for controlling group management, an input signal for requesting contents integration display, an input signal for requesting provision of related contents, and an input signal for requesting output of additional information and detailed information with respect to repeated contents. The generated input signals are transferred to the controller 110 such that the controller 110 performs a function according to an input signal.

The RF communication unit 150 performs the communication tasks of the portable terminal 100. The RF communication unit 150 establishes a preset communication channel with a supporting mobile communication system to perform communication tasks such as voice communication and data communication. The RF communication unit 150 may include an RF transmitter for up-converting a frequency of a transmitting signal and amplifying the up-converted signal and an RF receiver for low-noise-amplifying a received signal and down-converting the low-noise-amplified signal. In particular, the RF communication unit 150 according to the embodiment of the present invention may receive contents or data received from the devices 200. The RF communication unit 150 may transmit contents stored in the memory 120 to another device. The RF communication unit 150 may exchange data with another device for providing synchronizing service. The RF communication unit 150 may support data communication of 2G, 3G, and 4G protocols.

The near field communication unit 170 may establish a near field communication channel with other devices existing within a predetermined distance range. In particular, the near field communication unit 170 according to the embodiment of the present invention may collect contents or data from other devices to which a communication channel is connected. The near field communication unit 170 may support a near field communication scheme such as Bluetooth, infrared communication, Wi-Fi, Wi-Fi Peer to Peer (P2P), Wi-Fi Direct, home RF, and Zigbee. The near field communication unit 170 may perform a function of communication that accesses the Internet over a wireless medium. For example, the portable terminal 100 may access Internet through a near field communication network such as a Wi-Fi network.

The touch screen 130 may perform an input function and a display function. To do this, the touch screen 130 may include a display panel 131 and a touch panel 132.

The display panel 131 may display not only various menus of the portable terminal 100 but also information inputted by a user or information to be provided to the user. For example, the display panel 131 may provide various screens according to usage of the portable terminal 100; examples of various types screens include a home screen, a message creation screen, and a call screen. The display panel 131 may output an integration view screen displaying contents with different storage locations on one screen, a contents execution screen, a group management screen, a relation contents providing screen, an additional information display screen of repeated contents, and a detailed information screen of additional information. The various screens will be described in detail with reference to FIGS. 4 to 9. The display panel may be configured as a Liquid Crystal Display (LCD), an Organic Light Emitted Diode (OLED), or an Active Matrix Organic Light Emitted Diode (AMOLED).

The touch panel 132 is mounted on a front surface of the display panel 131. When activation or manipulation of a touch input device, such as, for example, a finger of the user, or stylus contacts on the touch panel 132, the touch panel 132 generates a touch event and transfers the generated touch event to the controller 110. The touch panel 132 may recognize a touch by detecting changes or variations of a particular in a physical characteristic of the touch panel 132 (e.g., capacitance, resistance, etc.) according to a contact of the touch input device. The touch panel 132 then transfers touch location information and types of touches (touch, touch release, tap, double tap, touch movement drag, flick, sweep, multi-touch, etc.) to the controller 110. The configuration of touch panel 132 is well known to those skilled in the art of the present invention, and thus a detailed description is omitted. Particularly, the touch panel 132 according to the present invention may generate a touch event for controlling a contents integration management mode, and transfer the generated touch event to the controller 110.

The memory 120 may store programs and user data necessary for a function operation to be performed according to an embodiment of the present invention. For instance, the memory 120 may store a program for controlling an overall operation of the portable terminal 100, an operating system (OS) for booting the portable terminal 100, and an application program necessary for other optional functions of the portable terminal 100, for example, a camera function, a voice playback function, an image or moving image playback function, or a near field communication function. The memory 120 may store contents, a phone-book, and a key map or a menu map for operating the touch screen 130. The key map or the menu map may be configured in various forms. For instance, the key map may include a keyboard map, a 3*4 key map, a Qwerty key map, or a control key map for controlling an operation of a currently activated application program. The menu map may include a menu map for controlling an operation of a currently activated application program. Particularly, the memory 120 according to an embodiment of the present invention may store a contents integration management program. The contents integration management program may include a contents collecting routine for supporting a contents collecting function from a plurality of devices 200, a contents classification routine for supporting a contents classification function based on similarity of the collected contents, a contents integration output routine for supporting screen display of the classified contents, a group management routine for supporting a group management function, a relation contents providing routine for supporting a relation contents providing function, a contents execution routine for supporting execution of selected contents, and a repeated contents display routine for supporting output of additional information and detailed information of repeated contents stored in a plurality of storage locations.

The memory 120 may store collected contents. The collected contents may be classified and stored based on similarity of contents. The memory 120 may store edition right (copy, movement, deletion, etc.) of stored contents. The memory 120 may store history information of the contents such as copy and movement. The memory 120 may store owner information of similar contents and/or group information generated based on selection of the user.

The controller 110 may control an overall operation of the portable terminal 100 and signal flow between internal blocks of the portable terminal 100. Particularly, the controller 110 according to the present invention may collect metadata of contents from the devices 200, and control a contents integration management function displaying the collected contents on one screen. In this case, the controller 110 may analyze meta data of the collected contents and classify and display the collected contents by similarity of contents. That is, the controller 110 may arrange similar contents as a group. To do this, the controller 110 may include a contents collector 111 and a similarity determinator 112.

The contents collector 111 may collect metadata of contents from a plurality of devices 200. The collection of the metadata may be periodically performed or may be performed when a contact is detected in a wireless communication network such as Wi-Fi. The collection of the meta data may be performed when the portable terminal 100 establishes a communication channel with another terminal through a near field communication function or a wired cable. The collection of the meta data may be performed as a background operation. Accordingly, this will be described below.

The similarity determinator 112 may analyze metadata of collected contents to determine similarity of contents. The similarity determinator 112 may determine the same contents as similar contents based on the determination result. When related contents display menu 610 (see FIGS. 6 and 7) is inputted on a screen of displaying similar contents of a specific classification, the similarity determinator 112 may provide contents associated with similar contents of the specific classification. The similarity determinator 112 controls the display panel 131 to display the similar contents of a specific classification and related contents in separated regions. The similarity determinator 112 may provide persons having contents similar to members selected from a group management screen as recommended members. A standard for determining similar contents, identical contents, related contents, and recommended member will be described later.

When there is a plurality of identical contents at different storage locations, the controller 110 may manage, in integrated fashion, one of the same contents as representative contents. The representative contents may include the latest stored contents, contents having the largest size, contents having the largest capacitance, and contents having a specific storage format.

Although not shown in FIG. 2, the portable terminal 100 may further include structural elements having additional functions such as a camera module for photographing images or moving images, a near distance communication module for near distance wireless communication, a broadcast receiving module for receiving broadcast, a digital sound source module such as an MP3 module, and an Internet communication module executing Internet functions. Since the structural elements can varied and/or changed according to design trends of digital devices, it is not possible to generate a comprehensive list of structural elements. However, the portable terminal 100 may include structural elements equivalent to the foregoing structural elements.

Figure 3:
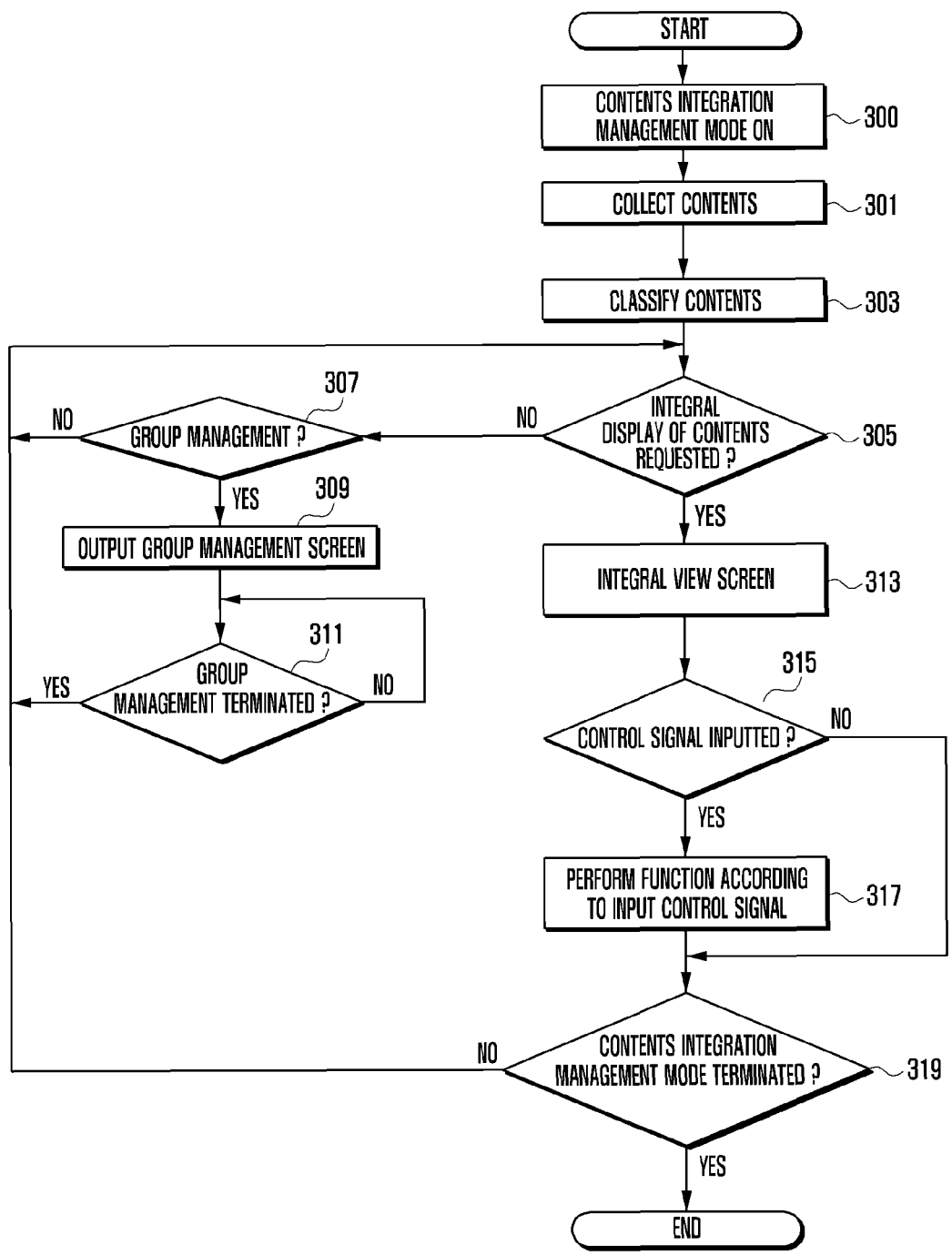
FIG. 3 is a flowchart schematically illustrating a method for managing, in integrated fashion, contents in a portable terminal according to an exemplary embodiment of the present invention.

FIG. 3 is a flowchart schematically illustrating a method for integratedly managing contents in a portable terminal according to an exemplary embodiment of the present invention.

Referring to FIGS. 1 to 3, a controller 110 according to an embodiment of the present invention may detect activation of a contents integration management mode (see step 300 of FIG. 3). The contents integration management mode is a mode providing a user interface which display contents having different storage locations stored in a plurality of devices 200 and the portable terminal 100 one screen and manage contents according to similarity of contents.

When the contents integration management mode is activated, the controller 110 may collect meta data of contents from a plurality of devices 200 (see step 301 of FIG. 3). The collection of the meta data may be periodically performed or be performed when a contact is detected in a wireless communication network such as Wi-Fi. The collection of the meta data may be performed when the portable terminal 100 establishes a communication channel with another terminal through a near field communication function or a wired cable. The collection of the meta data may be performed as a background operation. The collection of the meta data include synchronization between the portable terminal 100 and the devices 200. Specifically, the controller 100 may search a network for generated contents (e.g., photographing, moving image photographing, contents storage by the user, etc.) to perform synchronization. In this case, the controller 110 may perform synchronization through a network having a previously used history, a network authenticated by user, and a network connected through peripheral terminal. The controller 110 may perform synchronization through a mobile communication network such as 2G, 3G, or 4G or a wired network.

The controller 110 may analyze collected meta data and meta data of contents stored in the memory 120 to classify the contents (see step 303 of FIG. 3). The classification of the contents includes a similar contents classification and an identical contents classification.

First, the classification of the similar contents is described. The controller 110 may determine that contents are similar contents when the contents have the same or similar time information (e.g., within 30 minutes). When the contents have the same or similar location information (e.g., within 1 km), the controller 110 may determine that the contents are similar contents. When the contents have the same place or subject (building, object, person) through image analysis, the controller 110 may determine that the contents are similar contents. The controller 110 may determine that contents including the same key word in meta data as similar contents. The controller 110 may determine similarity of the contents based on content owner information. The controller may classify similar contents through combinations of the foregoing various methods.

Next, the same contents classification is described. The controller 110 may confirm a history such as copy, movement, or sharing of contents among meta data to determine presence of the same contents. To do this, when contents stored in a terminal 'A' are copied to a terminal 'B', the terminal 'B' may add history information indicating that the terminal 'B' contents are copied from the terminal 'A' to meta data of the copied contents. In the same manner, the terminal 'A' may add history information indicating that the history information is copied to the terminal 'B' to meta data of contents copied to the terminal 'B'. When the meta data are completely the same or are the same by greater than a preset value (e.g., 90%), the controller 110 may determine that the contents are the same contents. The controller 110 may set a plurality of contents, which the user designates as the same contents.

When it is determined that the contents are the same contents, the controller 110 may set one content as a representative content. The latest contents based on stored time information may be set as the representative contents. Contents having good quality obtained by confirming capacitance, a pressure rate, and format information of the contents may be set as the representative content. This is because an actually registered time may be different from other contents even though the same contents are registered in a plurality of devices 200; the capacitance, the storage scheme (format) of these contents are different according to a rule defined in a server registering contents.

The controller 110 may determine whether integral display of contents is requested (see step 305 of FIG. 3). When the integral display of contents is not requested, the controller 110 may determine whether group management is requested (see step 307 of FIG. 3). When the group management is not requested, the controller 110 may return to step 305. Conversely, when the group management is requested, the controller 110 may control a display panel 131 to output a group management screen (see step 309 of FIG. 3). In this case, the user may generate or remove a group using the group management screen and edit the generated group (member addition, member removal). The group management screen will be described in detail with reference to FIG. 4.

The controller 110 may determine whether group management is terminated (see step 311 of FIG. 3). That is, the controller 110 may detect whether a signal for terminating the group management is inputted. When the group management is not terminated, the controller 110 performs step 311. When the group management is terminated, the controller 110 may return to step 305.

When the integral display of contents is requested at step 305, the controller 110 may output an integral view screen displaying collected contents on one screen (see step 313 of FIG. 3). The integral view screen may classify and display a plurality of contents having different storage locations according to their association and user selection. In this case, when the contents are contents included in another terminal or another account, the integral view screen may include a URL having owner information and channel information of the contents. The integral view screen will be described in detail with reference to FIGS. 5 and 6.

The controller 110 may determine whether a control signal for controlling contents integration management is inputted (see step 315 of FIG. 3). When the control signal is not inputted, the controller 110 may go to step 319. Conversely, when the control signal is inputted, the controller 110 may perform a function according to the input control signal (see step 317 of FIG. 3). For example, the controller 110 may output a screen providing related contents. The screen providing related contents will be described in detail with reference to FIG. 7. When the specific contents are selected, the controller 110 may output a contents execution screen. In this case, when the selected contents are repeated contents, the controller 110 may display additional information associated with the repeated contents at a side of the contents execution screen. When a region in which the additional information is displayed is touched, the controller 110 may output detailed information with respect to the additional information. A detailed description thereof will be given with reference to FIGS. 8 and 9.

After step 317, the controller 110 may determine whether a signal for requesting termination of the contents integration management mode is inputted (see step 319 of FIG. 3). When the signal for requesting termination of the contents integration management mode is not inputted, the controller 110 may return to step 305 and repeat the foregoing procedures from step 305.

Although the foregoing embodiment has illustrated that the portable terminal 100 analyzes metadata of contents collected from a plurality of devices 200 to determine presence of similar contents and identical contents, the present invention is not limited thereto. For instance, the portable terminal 100 may transmit metadata of its contents and meta data of contents collected from the devices 200 to a preset server, and the server analyzes meta data of provided contents to determine presence of the similar contents and the identical contents. Next, the portable terminal 100 may receive a classification result from the server.

Figure 4:
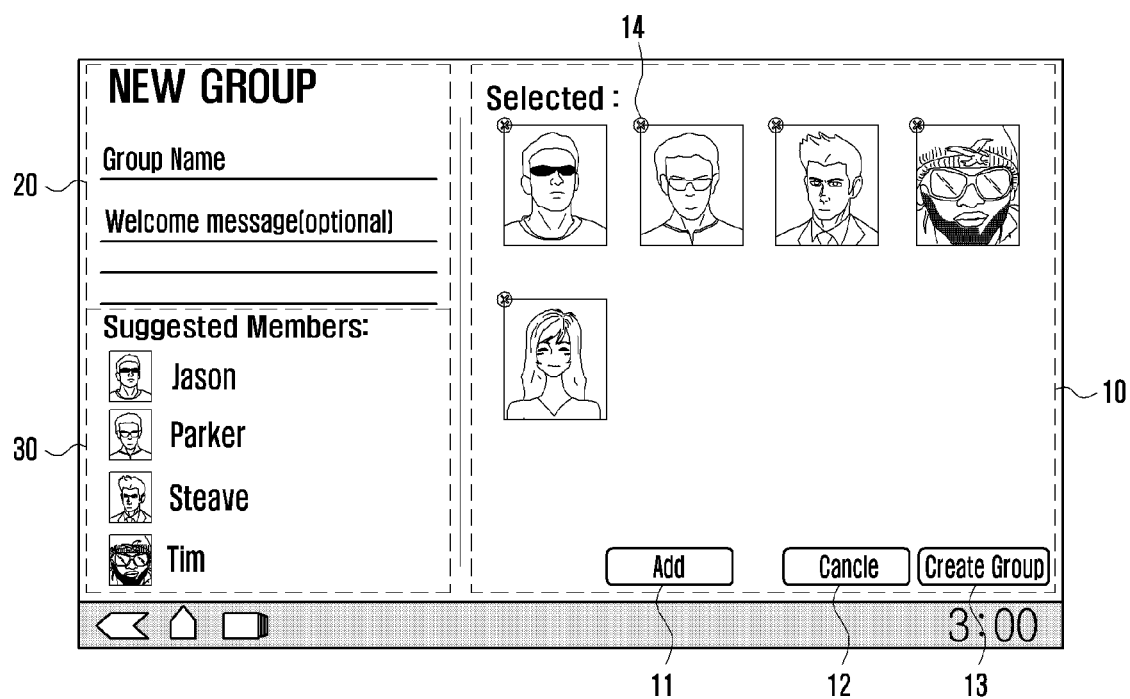
FIG. 4 is an exemplary diagram illustrating a screen for group management according to an exemplary embodiment of the present invention.

FIG. 4 is an exemplary diagram illustrating a screen for group management according to an exemplary embodiment of the present invention.

Referring to FIGS. 1 to 4, when a signal for requesting group management is inputted, the controller 110 according to an embodiment of the present invention may output a group management screen as illustrated in FIG. 4. The group management screen may include a group member display region 10 displaying selected group members, a group information display region 20 displaying group information and a recommended member display region 30 displaying recommended members.

The group information display region 20 is a region displaying information with respect to a selected group, and may include a region capable of inputting a group name and a region capable of inputting a message.

The group member display region 10 is a region displaying members of a selected group, and may display a thumbnail image of each member. Each thumbnail image has an icon 14 to which a removal function is allocated in one side thereof. The group member display region 10 may include a member addition menu 11, a group generation menu 13, and a cancel menu 12. A user may generate a group using the group generation menu 13. The group may be generated by the controller 110. For instance, the controller 110 may generate persons having similar contents as one group. The controller 110 may import group information registered in another terminal or a server (e.g., SNS server, a group of a phone-book). Meanwhile, when the member addition menu 11 is activated, the controller 110 may output a phone-book list and the user selects at least one person from registered phonebook and adds the selected person as a group member.

Continuing with FIG. 4, the recommended member display region 30 may display a searched recommended member according to a defined condition. For example, the controller 110 may provide persons having contents (namely, contents having similar meta data such as time or place) similar to the user among persons stored in a phone book as a recommended member. For example, when going to a tour with a friend, tour photographs may exist in the user's terminal and a friend's terminal. The tour photographs exist because metadata indicating time and location information are similar. The controller 110 may provide the tour photographs to persons to which wireless communication are connected, persons having the latest and highest frequency, and persons sharing a schedule as a recommended member. When information with respect to a third person includes information that allow a user and their third person to share content as part of information included in a user's phonebook, the controller 110 may provide the third person as a recommended member. The controller 110 recognizes face information from contents associated with a selected group. When a user, corresponding to a recognized face information, is registered in the phonebook, the controller 110 may provide the recommended member.

Alternatively, the user may select a specific member from the recommended member display region 30, drag & drop the group member into display region 10, and add the member as a group member.

FIGS. 5 to 9 are exemplary diagrams illustrating screens for describing a method for managing, in integrated fashion, contents according to an exemplary embodiment of the present invention.

Figure 5:
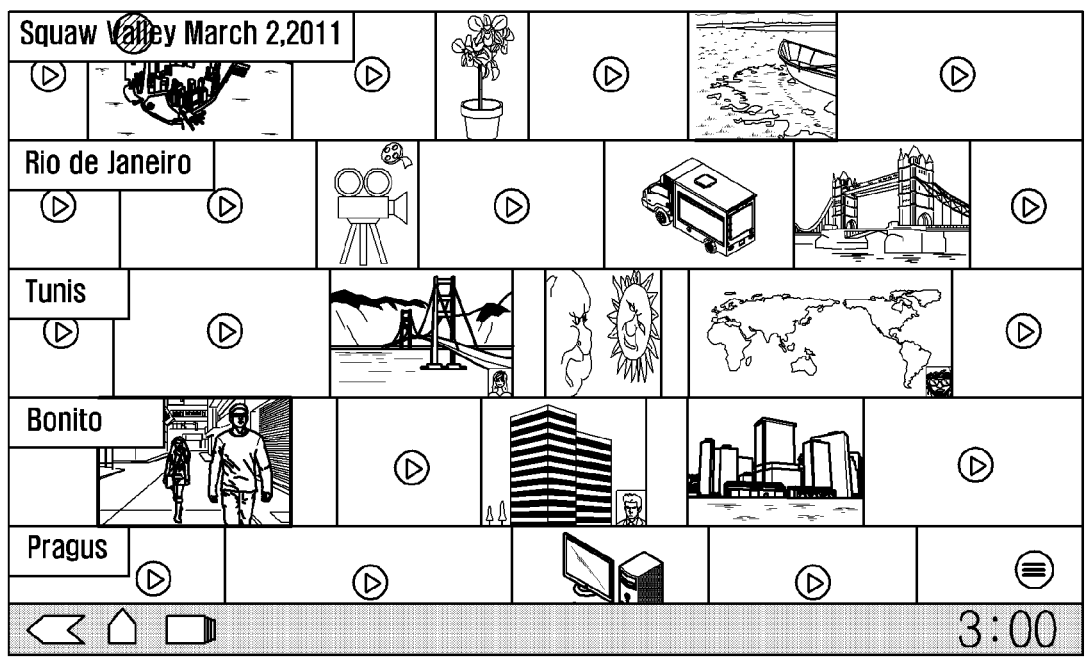
FIGS. 5 to 9 are exemplary diagrams illustrating screens for describing a method for managing, in integrated fashion, contents according to an exemplary embodiment of the present invention.

Referring to FIGS. 1 to 9, when a signal for requesting the contents integration display is inputted, the controller 110 may control the display panel 131 to output an integral view screen as illustrated in FIG. 5. The integral view screen may display contents by similar contents. For example, the controller 110 may display similar contents on one row. In this case, the controller 110 may display a classification criterion of the similar contents in a relatively small region (upper left end) of each row. The classification criterion may be meta data of the contents. Referring to FIG. 5, contents of a first row has a classification criterion of "Squaw Valley March 2, 2011", contents of a second row has a classification criterion of "Rio de Janeiro", contents of a third row has a classification criterion of "Tunis", contents of a fourth row has a classification criterion of "Bonito", and contents of a fifth row has a classification criterion of "Pragus". In this case, each row may be scrolled. That is, the user may scroll each row to confirm similar contents which are not displayed on a screen. The user may confirm similar contents having another classification criterion which is not displayed on a screen by scrolling up and down.

Figure 6:
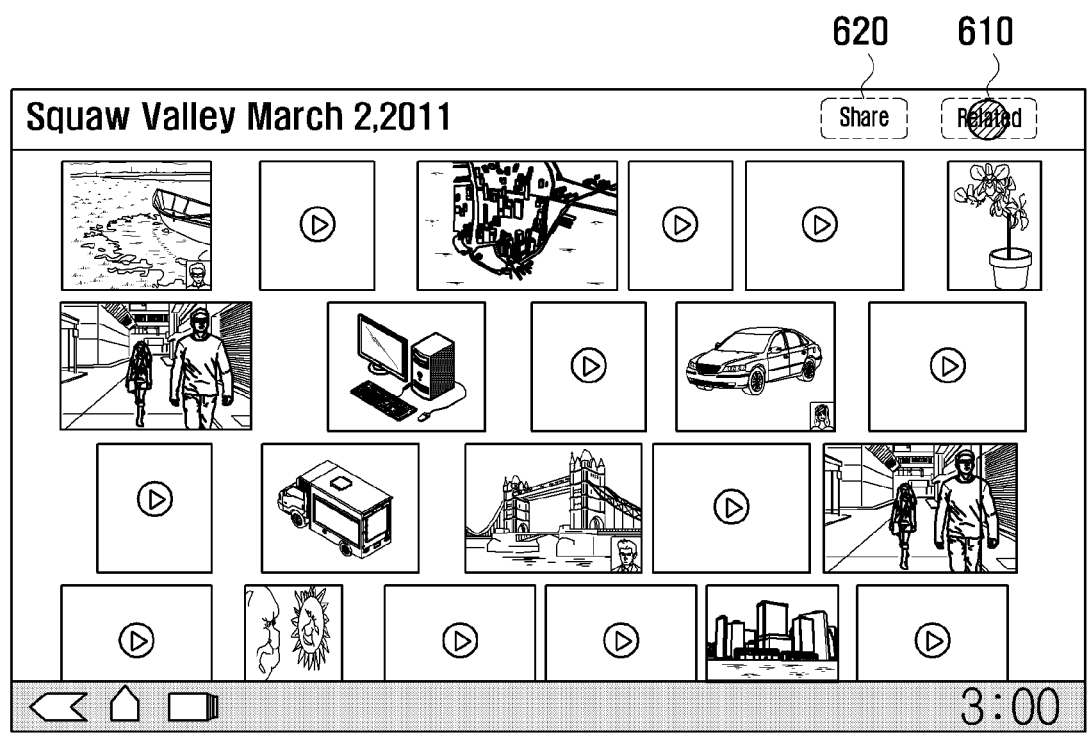

In a state of FIG. 5, when a signal selecting one classification criterion is inputted, the controller 110 may output a view screen displaying similar contents according to a selected classification criterion. For example, when a signal for selecting (touching) "Squaw Valley March 2, 2011" in FIG. 5 is inputted, the controller 110 may output a thumbnail view screen of similar contents as illustrated in FIG. 6. The thumbnail view screen may include a sharing menu 620 capable of sharing contents and a related contents display menu 610.

Figure 7:
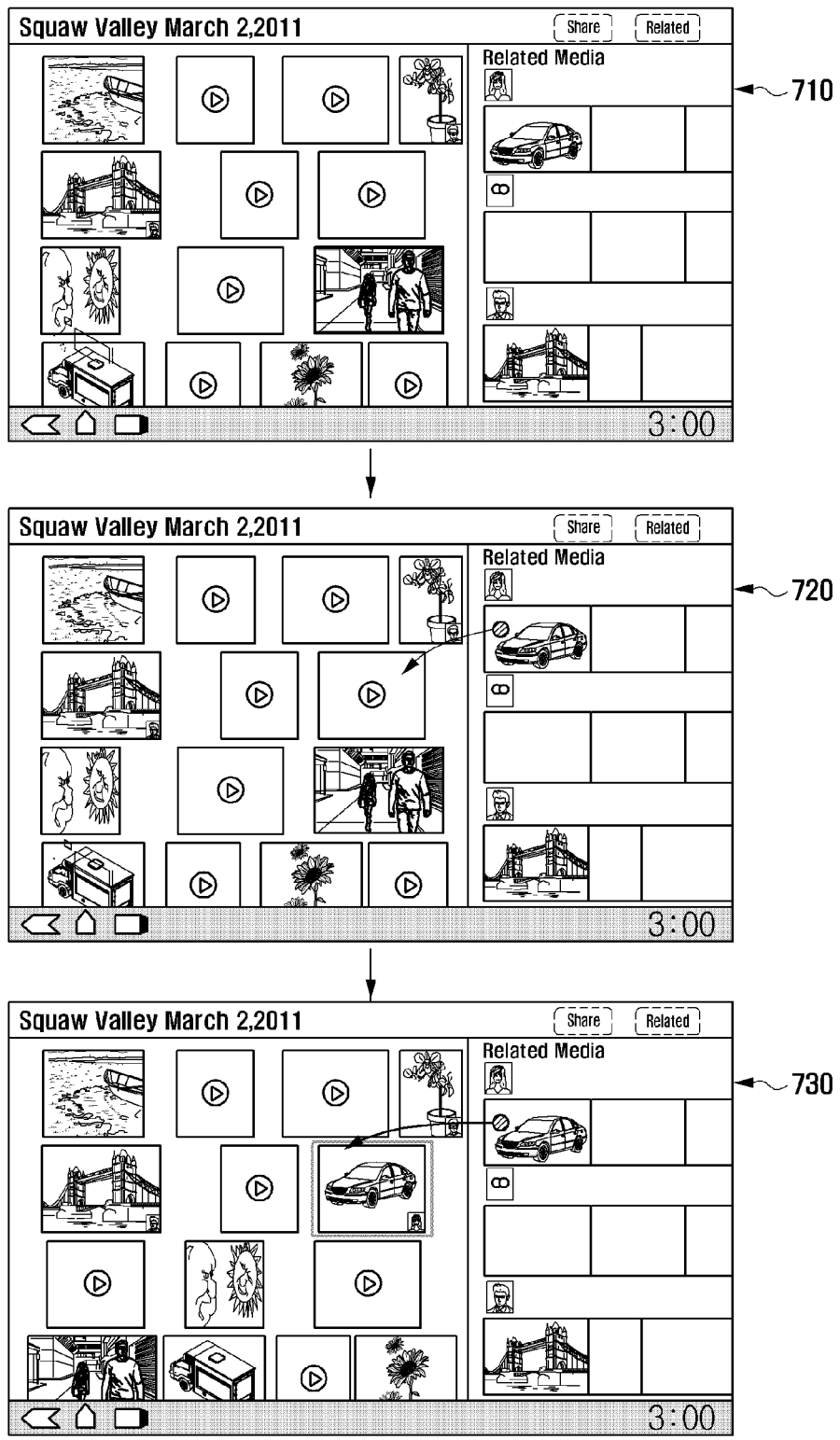

When the related contents display menu 610 is selected, the controller 110 may output related contents providing screen as illustrated in an example of a screen indicated by reference numeral 710 shown in FIG. 7. The related contents providing screen may include a region displaying similar contents and a region displaying related contents. The related contents may be selected from contents having group members. The related contents may be contents, which the user registers in a specific server (e.g., an SNS server, a cloud server, a web server providing a contents storage service). The related contents may be displayed by owners and registered servers (or accounts).

The user may move the related contents to a similar contents region through a drag & drop scheme as illustrated in an example of screens indicated by reference numerals 720 and 730. As such, the user may easily perform movement and management of contents having different storage locations. When contents stored in another terminal are moved to a similar contents region, the controller 110 may display user information on one side of a thumbnail image of corresponding contents to indicate that the contents are contents stored in another terminal. For instance, as illustrated in an example of the screen having reference numeral 730, the controller 100 may display a face image of a user on a lower right end of the thumbnail image.

Figure 8:
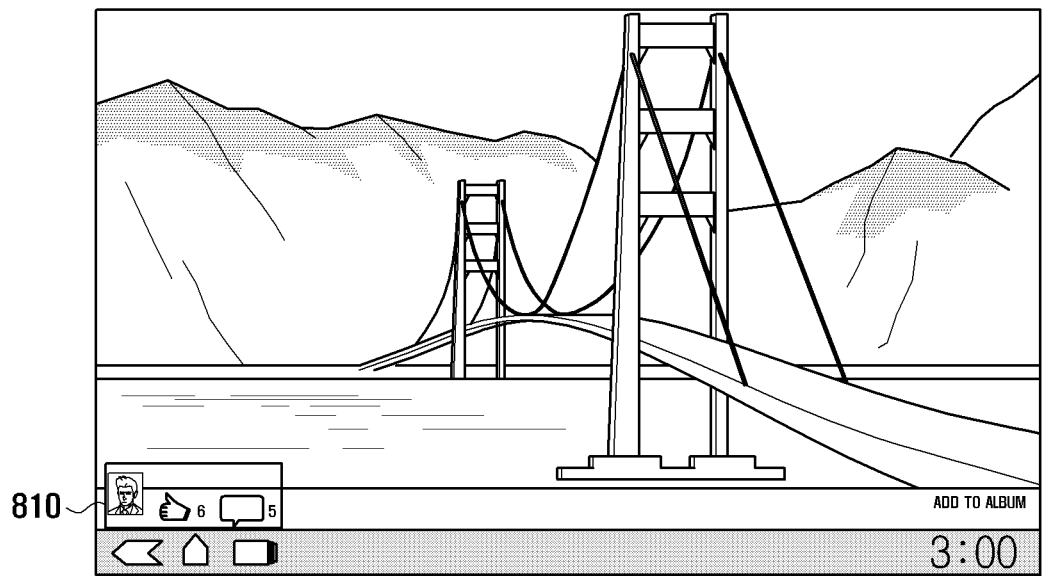

When specific contents are selected in states of FIG. 6 or 7, the controller 110 may output a contents execution screen. For example, when the contents are image contents, the controller 110 may output the selected image contents on a total screen. When the selected contents are repeated contents, the controller 110 may display additional information 810 associated with the repeated contents at a side (e.g., lower left end) of a screen as illustrated in FIG. 8. The additional information 810 may include contents such as owner information (name, e-mail address, contact point, etc.), preference information of a user, comments associated with the contents, information about users sharing the contents, a storage location (web service name, URL, etc.) of the contents, generation date, time, size, location information, and exit information of the contents.

Figure 9:
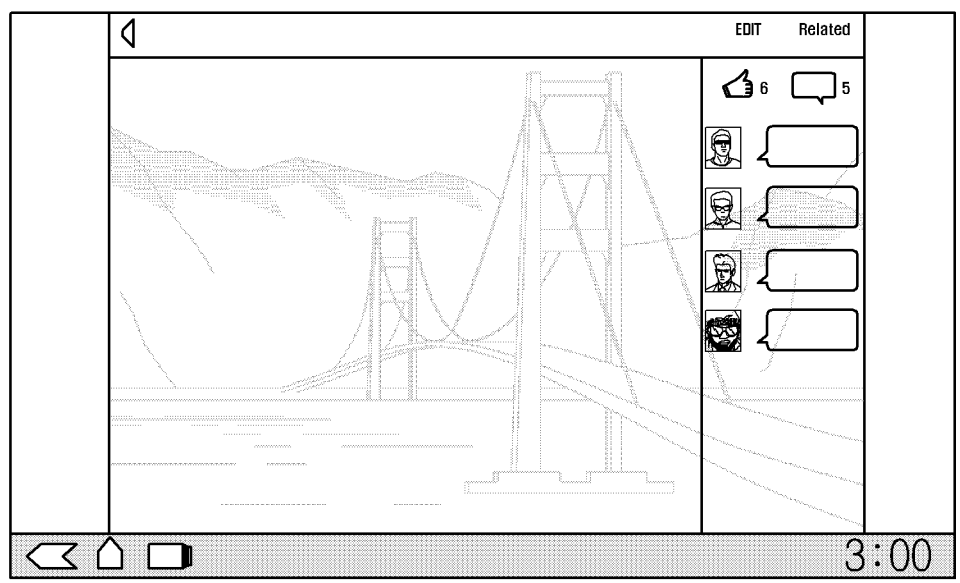

When a signal for selecting (touching) a region on which additional information 810 is displayed as shown in FIG. 8 is input, the controller 110 may output detailed information about the additional information. For instance, the controller 110 may output a detailed information screen as illustrated in FIG. 9. FIG. 9 shows an example of displaying comment information associated with the selected contents. However, the present invention is not limited thereto. That is, additional information outputted on the detailed information screen may be changed according to the desires of the user or a designer.

The foregoing method for managing, in integrated fashion, contents in a portable terminal of the present invention may be implemented in an executable program command form by various computer means and may be recorded in a computer readable recording medium. In this case, the computer readable recording medium may include selectively a program command, a data file, and a data structure or any combination thereof. In the meantime, the program command recorded in a recording medium (computer readable) may be specially designed or configured for the present invention or be well known to a person having ordinary skill in the particular computer software fields that are used. The computer readable recording medium includes Magnetic Media such as a hard disk, a floppy disk, magnetic tape, Optical Media such as Compact Disc Read Only Memory (CD-ROM), Digital Versatile Disc (DVD), Magneto-Optical Media such as floptical disk, and a hardware device such as ROM, RAM, flash memory storing and executing program commands. Further, the program command includes a machine language code created by a complier and a high-level language code executable by a computer using an interpreter. The foregoing hardware device may be configured to operate as at least one software module for performing an operation of the present invention.

As mentioned above, the method and an apparatus for managing, in integrated fashion, contents in a portable terminal according to an embodiment of the present invention, may integrate contents having different storage locations and show them on one screen. Accordingly, the present invention can improve convenience of contents management by the user. Further, the present invention may classify and display contents by similarity of contents based on metadata of the contents. Therefore, the present invention can easily manage (move, copy, deletion, etc.) related contents stored in different locations.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined and recited in the appended claims.

What is claimed is:

1. A method for displaying an integrated content screen, the method comprising:

classifying content items into at least one of a first group and a second group;

displaying a screen having a first section and a second section, the first section including a first plurality of thumbnails and the second section including a second plurality of thumbnails, wherein each one of the first plurality of thumbnails corresponds to a respective content item that is classified into the first group and each one of the second plurality of thumbnails corresponds to a respective content item that is classified into the second group;

detecting a first input dragging a first thumbnail from the first section into the second section, the first thumbnail corresponding to a first content item that is classified into the first group; and in response to the first input, maintaining in the first section display of the first thumbnail while displaying in the second section a second thumbnail, wherein the second thumbnail includes a copy of the first thumbnail and a copy of an image corresponding to an owner of the first content item superimposed onto the first thumbnail, and wherein the second thumbnail displayed only after the first thumbnail is dragged out of the first section by the first input.

2. The method of claim 1, wherein the image corresponding to the owner includes a graphical representation of the owner.

3. The method of claim 1, wherein the image corresponding to the owner includes a facial image of the owner.

4. The method of claim 1, wherein the second thumbnail is displayed in response to the first content item being stored at a remote location.

5. The method of claim 1, wherein the second plurality of thumbnails is sorted based on ownership of content items that are classified into the second group.

6. The method of claim 1, wherein the content items are classified based on metadata that is part of the content items.

7. The method of claim 1, further comprising detecting a second input selecting the second thumbnail and presenting an execution screen corresponding to the first content item, in response to the second input.

8. The method of claim 1, wherein classifying the content items into at least one of the first group and the second group includes:
  detecting that a second content item is same as a third content item based on history information associated with the second content item and the third content item;
  selecting the third content item as a representative content item; and
  classifying the third content item into the first group as a result of selecting the third content item as the representative content item.

9. The method of claim 8, further comprising:
  detecting a second input selecting the third content item; and
  displaying additional information regarding the second content item in response to the second input.

10. The method of claim 8, wherein the third content item is selected as the representative content item based on at least one of size of the third content item, format of the third content item, compression ratio of the third content item, and time information associated with the third content item.

11. The method of claim 1, further comprising:
  displaying the first plurality of thumbnails divided into separate rows in the first section, each row associated with a respective owner; and
  displaying above each row an owner thumbnail image corresponding to the respective, owner,
  wherein the image superimposed onto the first thumbnail is a copy of one of the owner thumbnail images.

12. An electronic device for displaying an integrated content screen, the electronic device comprising a processing circuitry configured to:
  classify content items into at least one of a first group and a second group;
  display a screen having a first section and a second section, the first section including a first plurality of thumbnails and the second section including a second plurality of thumbnails, wherein each one of the first plurality of thumbnails corresponds to a respective content item that is classified into the first group and each one of the second plurality of thumbnails corresponds to a respective content item that is classified into the second group;
  detect a first input dragging a first thumbnail from the first section into the second section, the first thumbnail corresponding to a first content item that is classified into the first group; and
  in response to the first input, maintain in the first section display of the first thumbnail while displaying in the second section a second thumbnail that includes a copy of the first thumbnail on which is superimposed an image corresponding to an owner of the first content item, the second thumbnail displayed only after the first thumbnail is dragged out of the first section by the first input.

13. The electronic device of claim 12, wherein the image includes a graphical representation of the owner.

14. The electronic device of claim 12, wherein the image includes a facial image of the owner.

15. The electronic device of claim 12, wherein the second thumbnail is displayed in response to the first content item being stored on another electronic device.

16. The electronic device of claim 12, wherein the second plurality of thumbnails is sorted based on ownership of content items that are classified into the second group.

17. The electronic device of claim 12, wherein the content items are classified based on metadata that is part of the content items.

18. The electronic device of claim 12, wherein the processing circuitry is further configured to detect a second input selecting the second thumbnail and presenting an execution screen corresponding to the first content item, in response to the second input.

19. The electronic device of claim 12, wherein classifying the content items into at least one of the first group and the second group includes:
  detecting that a second content item is same as a third content item based on history information associated with the second content item and the third content item;
  selecting the third content item as a representative content item; and
  classifying the third content item into the first group as a result of selecting the third content item as the representative content item.

20. The electronic device of claim 19, wherein the processing circuitry is further configured to:
  detect a second input selecting the third content item; and
  display additional information regarding the second content item in response to the second input.

21. The electronic device of claim 19, wherein the third content item is selected as the representative content item based on at least one of size of the third content item, format of the third content item, compression ratio of the third content item, and time information associated with the third content item.

22. The electronic device of claim 12, the processing circuity further configured to:
  display the first plurality of thumbnails divided into separate rows in the first section, each row associated with a respective owner; and
  display above each row an owner thumbnail image corresponding to the respective owner,
  wherein the image superimposed onto the first thumbnail is a copy of one of the owner thumbnail images.

* * * * *